(12) United States Patent
Oyekanmi

(10) Patent No.: US 9,992,638 B1
(45) Date of Patent: Jun. 5, 2018

(54) SYSTEM AND METHOD OF FACILITATING MANAGEMENT OF COMMON CHANNEL BASED SERVICES

(71) Applicant: Oluwagbamila Oluwakolade Oyekanmi, Uniondale, NY (US)

(72) Inventor: Oluwagbamila Oluwakolade Oyekanmi, Uniondale, NY (US)

( * ) Notice: Subject to any disclaimer, the term of this patent is extended or adjusted under 35 U.S.C. 154(b) by 0 days. days.

(21) Appl. No.: 15/407,520

(22) Filed: Jan. 17, 2017

(51) Int. Cl.
　　*H04W 4/12*　　(2009.01)
　　*H04W 12/06*　　(2009.01)
　　*G06Q 20/10*　　(2012.01)
　　*G06F 17/30*　　(2006.01)

(52) U.S. Cl.
　　CPC ........ *H04W 4/12* (2013.01); *G06F 17/30979* (2013.01); *G06Q 20/102* (2013.01); *H04W 12/06* (2013.01)

(58) Field of Classification Search
　　CPC ......... H04W 4/14; H04W 4/001; H04W 8/26; H04W 4/12; H04W 12/06; G06F 17/30979; G06Q 20/102
　　See application file for complete search history.

(56) References Cited

U.S. PATENT DOCUMENTS

| 2008/0108333 A1* | 5/2008 | Jemison ................ H04W 88/18 455/414.1 |
| 2011/0045818 A1* | 2/2011 | Banks ................. H04L 12/5895 455/422.1 |

* cited by examiner

*Primary Examiner* — Daniel Lai

(57) ABSTRACT

Disclosed is a method of facilitating management of common channel based services. The method includes receiving at least one query comprising each of the primary access code and the sub access code. The method further includes searching a registry based on the at least one query to determine availability of each of the primary access code and the sub access code. Further, the method includes associating each of the primary access code and the sub access code with at least one common channel based service. Yet further, the method includes receiving at least one request call comprising each of the primary access code and the sub access code. Further, the method includes identifying the at least one common channel based service. Moreover, the method includes processing the request call based on the identifying of the at least one common channel based service.

20 Claims, 13 Drawing Sheets

SYSTEM AND METHOD OF FACILITATING MANAGEMENT OF COMMON CHANNEL BASED SERVICES

FIELD OF THE DISCLOSURE

Generally, the disclosure relates to telecommunication systems. More specifically, the disclosure relates to a method and system of facilitating management of common channel based services.

BACKGROUND

Telecommunication systems provide mobile voice communication capability along with mobile messaging including Short Message Service (SMS), Unstructured Supplementary Service Data (USSD), Multimedia Messaging Service (MMS) among others. The USSD is a mobile telecommunication signaling (common channel) data bearer or protocol that allows interactive (two-way) transmission of information between an USSD enabled User Equipment (UE), also often technically referred to as Mobile Station (MS), such as mobile phone or tablet, and applications/services hosted by a telecommunication Operator or service partners in a real time "connection oriented" manner USSD was originally developed for GSM (Global System for Mobile communication) by the 3rd Generation Partnership Project (3GPP), and also incorporated into its successor Universal Mobile Telecommunication Systems (UMTS) which supports various air interface standards including Time Division—Synchronous Code Division Multiple Access (TD-SCDMA), and Wideband-Code Division Multiple Access. The USSD is also supported on the 4th Generation telecommunication standard—Long-Term Evolution (LTE). Further, improved solutions allow USSD based messaging options over common channel in other non-GSM mobile networks.

USSD is commonly used by prepaid GSM cellular phones users to query the available airtime balance. However, albeit it is a low bandwidth protocol, it can be used to deliver and transmit any other alphanumeric data of up to 182 characters per message payload in a series of two-way query and response communication. The USSD has also been used within telecommunication systems for transporting call control management information within a wireless network. Also, it has been employed for classic services such as using the multi delimited USSD codes for implementing subscriber defined usage limits right from a mobile terminal, while sending both Password and Usage limit appended to a Service Code in one USSD dial request.

Further, almost all GSM/GPRS/WCDMA/LTE User Equipment (UE) and mobile devices available on the market today, including the most basic feature phones, have the required capabilities to support the USSD-based services, thereby making services provided over this channel accessible to a larger audience than mobile Internet-enabled devices. This is significantly important in regions where Internet data connectivity is unavailable, unstable or expensive.

Moreover, services delivered on the USSD channel are accessible to users even when out of their home network; for example, when roaming on another Telecom network in local or foreign country as provided in the technical GSM 02.90 (ETSI TS 100 625, V7.0.0) specification that when a serving network receives such a message from a visiting subscriber, it shall pass the USSD message directly to the HPLMN, further expanding the availability of services offered on this channel. It is also possible to utilize this service when the mobile device/station MS is being used for a call or out of call.

The simplicity of access, and simplicity of the content and services deployed over this channel, make it well suited and efficient for solutions aiming to deliver simple fast access to information, such as service enquiries, subscriptions opt-in/opt-out, data collection, polling, consenting, two-way interaction services, collaboration, and the likes in a real-time bidirectional fashion. Moreover, with the advancements in Micro-Electro-Mechanical (MEM) and sensory devices powering the Internet of things (IoT), the USSD channel is well suited for providing reliable connectivity for this fast growing application.

Several efforts have been made to leverage the high potentials of the USSD for effective service delivery. Some solutions provide a smarter user-end client application to consume USSD-based services, with embedded decoder facility to interpret received messages and convert them to structured languages for rich display by the client.

However, access codes, often referred to as service codes or shortcodes (likeable to telephone numbers in voice calls or IP Addresses in the Internet space) for USSD in telecommunication networks are limited, often allocated or assigned to telecommunication operators and licensed Telecom Value Added Service providers by regulatory bodies, and are as such considered and treated as scarce resources. With the increasing need for easy and cheaper access to connectivity for human and sensor devices, breaking the barrier of access code limitations for potent telecommunication protocols/technologies, such as USSD and SMS, similar to how the IP addressing schemes, simplified and democratized the Internet connectivity, will be of a great importance, especially where these capabilities are present, underutilized or unused, for consumers and operators alike.

In addition to the limited number of access codes, the typical processes, systems and methods of allocating or assigning access codes to intending services/applications, and deploying the associated application services are mostly clumsy, not flexible, point-to-point, and technically involving, thus preventing commercial-scale deployment and adoption of this versatile communication channel. A typical timeline for code allocation, development and deployment of USSD based services in a mobile operator environment ranges from 12 weeks to several months.

Accordingly, some methods employ other channels (SMS, MMS, Voice calls, Long Number calling, data calls, GPRS, WAP, IVR, Emails etc) as initiation mechanism for USSD services, where a dedicated Destination Terminal (DT) that receives such calls act as intermediaries for initiating a callback-like USSD Push to the initiating Terminal to begin the transaction. Similarly, voice channel or text may be used as access entry point or initiator for USSD based services and applications, introducing a Voice or Call handling terminal device (DT) to mediate between the voice network and the common (signaling) channel USSD gateway. The method requires prospective service owners to work with the telecommunication operator for the setup, configuration and deployment of the DT terminals in network or as software on handsets, integration into the Gateway (GTW) node and configuration of the GTW for every application. These approaches are time-consuming, demanding, complex and inhibiting web-scale deployment of services over the USSD channel.

Therefore, there is a need for improved methods, apparatus and devices to provide improved methods and system to enable dynamic search and reservation of access codes, and automated deployment and delivery of common channel based services on telecommunication networks, with support for easy adoption, web scale load handling to enable large commercial-scale service delivery on the low bandwidth channels, such as the USSD.

SUMMARY

Disclosed is a method of facilitating management of common channel based services. The method includes receiving, from at least one user device, at least one query comprising each of the primary access code and the sub access code. The method further includes searching a registry based on the at least one query to determine availability of each of the primary access code and the sub access code. Further, the method includes associating, using a processor, each of the primary access code and the sub access code with at least one common channel based service, wherein the associating is based on the availability. Yet further, the method includes receiving, from at least one client device, at least one request call comprising each of the primary access code and the sub access code. Further, the method includes identifying, using the processor, the at least one common channel based service based on each of the primary access code and the sub access code. Moreover, the method includes processing, using the processor the request call based on the identifying of the at least one common channel based service.

Further, the disclosure relates to systems, methods, processes and apparatus to enable efficient and dynamic allocation of access codes, definition, activation and automated deployment of services for delivery over the common channel data bearer or protocol in a real-time or near real-time manner (with capacity to reduce the required deployment timelines to minutes rather than weeks or months). This enables large scale adoption, deployment and the realization of untapped revenue of the alternate messaging telecommunication channels, such as USSD, on mobile telecommunication networks.

According to an aspect, the disclosure relates to methods for dynamic allocation of codes allowing customer easy and self-defined access with option to choose pattern of code for alignment of preferences, purpose or need of the customer and for easy recollection and sharing, similar to what obtains in web address URLs today.

According to another aspect, the disclosure relates to tools and methods for defining, generation, deployment and maintenance of the backend services and applications for a common channel access code by ordinary users in a self-service, unassisted manner.

According to yet another aspect, the disclosure relates to an apparatus and a method for hosting and operational service delivery on low bandwidth communication protocols for web-scale loads that supports millions of concurrent users.

Further, the disclosure relates to a method for integration of telecommunication network entity applications into generic external systems for extended possibilities.

According to an aspect, a method of facilitating management of common channel based services is disclosed. The method includes associating, using a processor, each of a primary access code and a sub access code with at least one common channel based service. The method further includes deploying, using the processor, the at least one common channel based service based on each of the primary access code and the sub access code. Further, the method includes receiving, from at least one client device, at least one request call comprising each of the primary access code and the sub access code. Yet further, the method includes identifying, using the processor, the at least one common channel based service based on each of the primary access code and the sub access code. Moreover, the method includes processing, using the processor the request call based on the identifying of the at least one common channel based service.

According to another aspect, a system for facilitating management of common channel based services is disclosed. The system includes a communication module configured for receiving at least one request call comprising each of a primary access code and a sub access code. Further, the system includes a storage module configured to store a registry comprising an association between the common channel based service and each of the primary access code and the sub access code. Moreover, the system includes a processor configured for identifying the at least one common channel based service based on each of the primary access code and the sub access code and processing the request call based on the identifying of the at least one common channel based service.

Some embodiments relate to computer systems, apparatus, and computer programs recorded on one or more computer storage devices, each configured to perform the actions of the methods herein claimed. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Various embodiments include one or more of the following processors and transformations: interface and tools for availability search, selection and reservation of access codes, shortcodes; alphanumeric to dial-pad-compatible service codes translator and isolation system; service codes availability controllers; lock control and code allocation assurance system for multiple concurrent requests operations; service code registry and catalogue processors; service definition encoder and decoder, low bandwidth protocol applications builder tools and interfaces; service code multiplexers, service requests routers; secure multi-codes or sub access codes sessions handlers; generic services gateways or content formatter and messaging handlers; and integrated tenant services search engines.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary.

Figure 1:
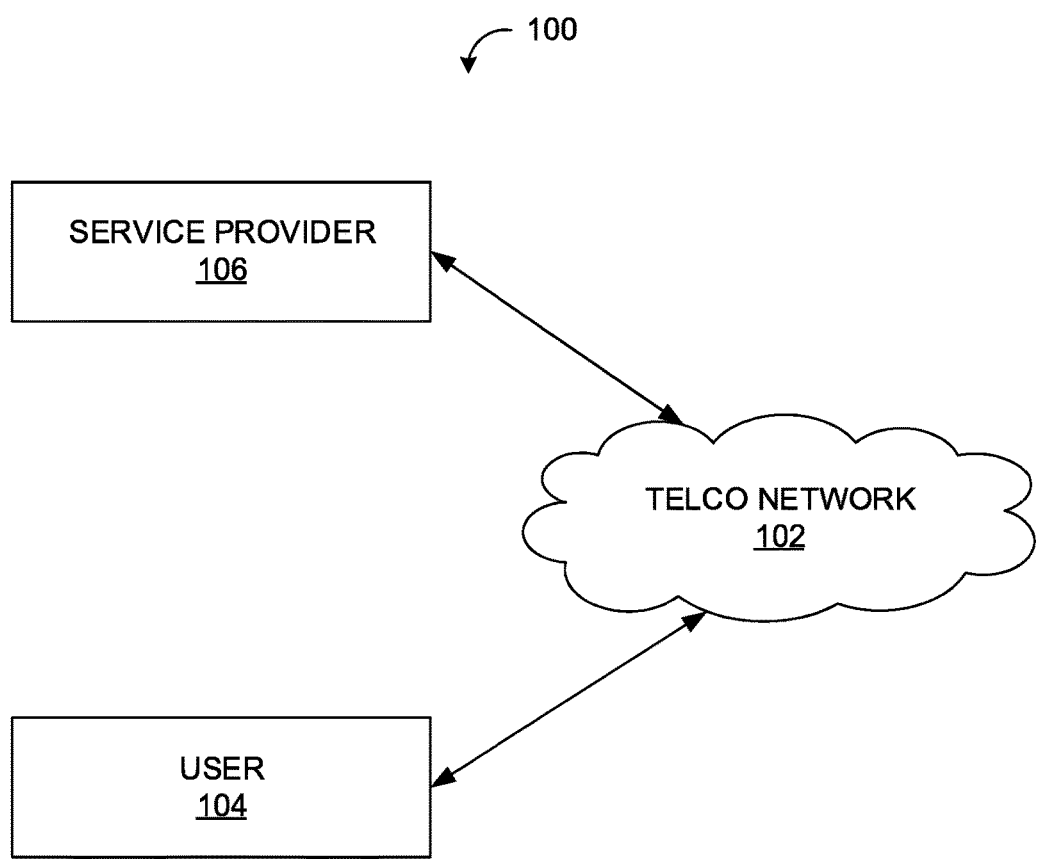
FIG. 1 illustrates an exemplary environment in which the present invention may be deployed.

FIG. 1 illustrates an exemplary environment 100 in which the present invention may be deployed. The environment 100 includes a telecom operator 102, one or more users 104 and one or more service providers 106. The telecom operator 102 may provide communication services like voice calling or text messaging services like Short Message Service (SMS) and Unstructured Supplementary Service Data (USSD). The one or more users 104 may use the services provided by the telecom operator 102. The one or more service providers 106 may provide specific services; for example, banking, to the one or more users 104.

Figure 2:
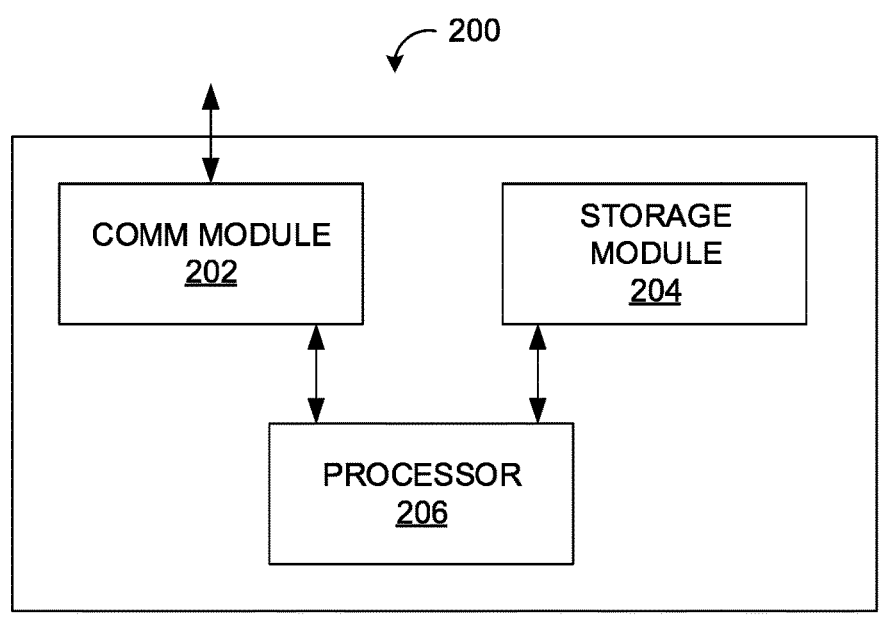
FIG. 2 illustrates a block diagram of a system of facilitating management of common channel based services, in accordance with an embodiment.

FIG. 2 illustrates a block diagram of a system 200 of facilitating management of common channel based services, in accordance with an embodiment. The system 200 includes a communication module 202, a storage module 204 and a processor 206. The system 200 may be deployed at the telecom operator 102.

The communication module 202 may be configured for receiving one or more request calls comprising each of a primary access code and a sub access code. The one or more request calls may be received from the one or more users 104. For example, a request call may be *222*55555#, wherein 222 is the primary access code and 55555 is the sub access code.

The communication module 202 may be further configured for receiving one or more queries comprising each of the primary access code and the sub access code. Further, the processor 206 may be configured for searching the registry based on the one or more queries to determine availability of each of the primary access code and the sub access code; and reserving each of the primary access code and the sub access code in association with the one or more queries based on the availability.

The storage module 204 may be configured to store a registry comprising an association between a common channel based service and each of the primary access code and the sub access code. For example, the registry in storage module 204 may indicate an association between a request call *222*55555# and a weather information service. The registry may include associations between multiple common channel based services and the corresponding primary access codes and the sub access codes. The common channel based services may include USSD based services.

Moreover, the processor 206 may be configured to identify the one or more common channel based services based on each of the primary access code and the sub access code. The processor 206 is further configured to process the request call based on the identifying of the one or more common channel based services. For example, the processor 206 may identify the weather information service based on the received request call *222*55555#. Further, the processor 206 may process the identified weather information service, which may include sending weather information to the respective user via a USSD message.

The processor 206 may be further configured for determining presence of alphabetic characters in at least one of the primary access code and the sub access code; and translating the alphabetic characters into the corresponding dial-pad characters based on the determining. For example, a request call *222*WEATHER# may be translated to dial-pad characters as *222*9328437#.

The one or more request calls may be associated with a generic external server, wherein the communication module 202 may be further configured for communicating with the generic external server, wherein the processor 206 may be further configured for performing at least one of conversion of the one or more request calls to a form compatible with the generic external system and conversion of one or more responses received from the generic external server to a form compatible with a client device associated with the one or more request calls.

Figure 3:
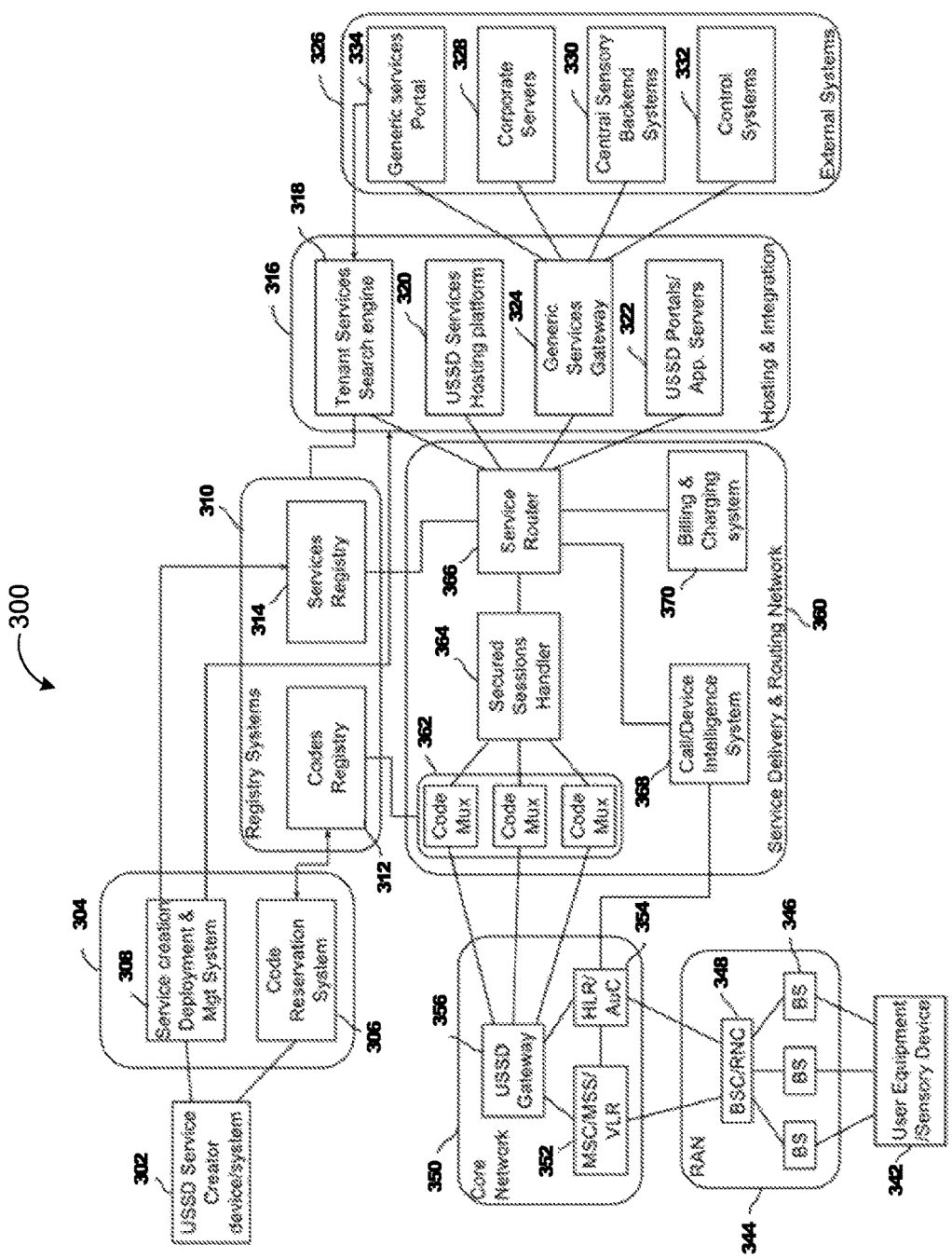
FIG. 3 illustrates a block diagram of an online IT system for unassisted access code reservation, service creation, deployment and delivery, according to some embodiments.

FIG. 3 illustrates a block diagram of an online IT system 300 for unassisted access code reservation, service creation, deployment and delivery, according to some embodiments. A GSM or UMTS USSD accessed system 340 illustrates production usage (service delivery) of service deployed.

An intending USSD service provider (for example, the service provider 106) may use an Internet enabled device 302 to access a self-service, unassisted code reservation and USSD service management network 304. The network 304 may implement a user registration and authentication system. If the user has no prior access code assigned, a code reservation module 306 may be used to conduct an availability search and reserve or register a dedicated service access code on the access code registry system 312 implemented as part of a registry system 310. In a further embodiment, with an assigned dedicated access code, a service creation, deployment and management system 308 is implemented for an unassisted building or development of one or more intended USSD service applications, which may be deployed on any of a hosting apparatus 316 or integrated with external systems 326. After deployment, a service registry 314 is updated to activate and publish the service for the user (for example, the one or more users 104).

Key interacting subsystem of a GSM or UMTS network includes a User Equipment (UE) 342 (often referred to as Mobile Station (MS)), a Radio Access Network (RAN) 344, and a Core Network (CN) 350. The RAN 354 provides the wireless services and may include multiple Base Stations (BS) 346 or Base Transceiver Stations (BTS) each controlled by a Base Station Controller (BSC) 348 often referred to as Radio Network Controller (RNC) in UMTS networks which transmits signals between the UE 342 and the CN 350.

The CN 350 may include a mix of one or more circuit-switched Mobile Switching Center (MSC) 352 (or Mobile Soft Switches (MSS) or Visitor Location Register (VLR)), and Home Location Register (HLR) 354 (or Authentication Center (AuC)), one or more USSD gateways 356 and other network elements, not represented here for simplicity of illustration. The one or more USSD gateways 356 may be integrated to any or all of MSC/MSS/VLR 352 and HLR/AuC 354. The one or more USSD gateways 356 may be configured to allow transparent communication between the UE 342 and a network entity application hosted on any server or system capable of providing services and may be integrated to the one or more USSD gateways 356 using either the SS7 communication protocol, SS7 over IP (SIGTRAN) or conventional IP related technologies. In the GSM and UMTS networks, the communication of USSD messages via the BS 346, the BSC 348, the MSC 352 and the one or more USSD gateways 356 is often achieved over the common (signaling) channel or its IP SIGTRAN variant.

A service delivery and routing network 360 may be integrated into the CN 350 using any of the protocols for handling multiple concurrent USSD communication transactions between the UE 342 and specifically identified (with dedicated access codes) application services hosted on hosting apparatus of the hosting and integration systems 316 or on integrated external systems 326, which may be a generic services portal 334 such as Google search engine interface, Twitter, News site and the like, or Corporate Business application servers 328, Central Sensory application back-end systems 330 or a sensor input control system 332, in a largely scalable architecture.

One or more Code Multiplexing processors (CodeMux) 362, may be integrated into the one or more USSD gateways 356 in one or more telecommunication operator networks, using code assignment details available on the code register 312 for effective access code identification. A Secure Session Handler (SSH) 364 may be programmed to perform functions including session setup, tracking, recovery, maintenance, and termination for Multiplexed-codes environment, and enforcement of security of data transmitted between the one or more USSD gateways 356 and the target application services in the Hosting and integration systems 316 or external systems 326. A service router 366, deployable in clusters, may be implemented in conjunction with the service register 314, for effective routing of traffic to destination or serving application system 316 or 326, or in the case of a push USSD session from the originating application service provider to a destination USSD gateway 356. In a further embodiment, SSH handles an end-to-end protection of messages from the UE 342 incorporating USSD smart clients capable of secure messaging and the service providing application hosted on hosting and integration 316 or external systems.

In some embodiments, a call and device intelligence system (CDIS) 368 may be implemented to extract details relating to the UE 342 from the HLR 354 which stores details about the calling device the UE 342 and gets updated by the VLR 352 with location information of the UE 342 as the device and user roams from one switching location to another. The HLR 354 is the origin database containing all data on a subscriber including numbers associated with the subscriber (MSISDN, IMSI), subscriber type (postpaid or prepaid), service subscriptions (SMS, Call, Data, Call forwarding), current subscriber location (i.e. MSC/MSS/VLR 352 that is currently serving the subscriber). In cases, where such information is required for delivery of service, this may be made available to serving applications hosted on authorized apparatus in the hosting and integration 316 or the external systems 326 via regulated processes in the service router 366. An example of such applications may be, location aware services, such as "find nearest restaurant". In this example, a user may dial the access code for the service and select an option for the nearest restaurants. The user location information is requested from the CDIS 368 by the authorized application, authenticated by the service register 314 and service router 366, which in turn requests real-time network-based location of the UE 342 from the HLR 354 or from the VLR 352 via the HLR 354. This information may be configured to deliver this sensitive information with a high level of control and user consent to only authorized service, which therefrom performs operations to auto search relevant data sources for restaurants around the caller, and returns the requested information back to the user. Other caller or call attributes tracked or stored by the HLR 354 and other CN 350 elements may also be utilized in a similar fashion.

Similarly, in a further embodiment, user or application service billing and charging, audit, and commercial related operations may be achieved by integration of one or more billing and charging systems 370 or other required operational management or commercial systems into the service delivery and routing network 360.

Figure 4:
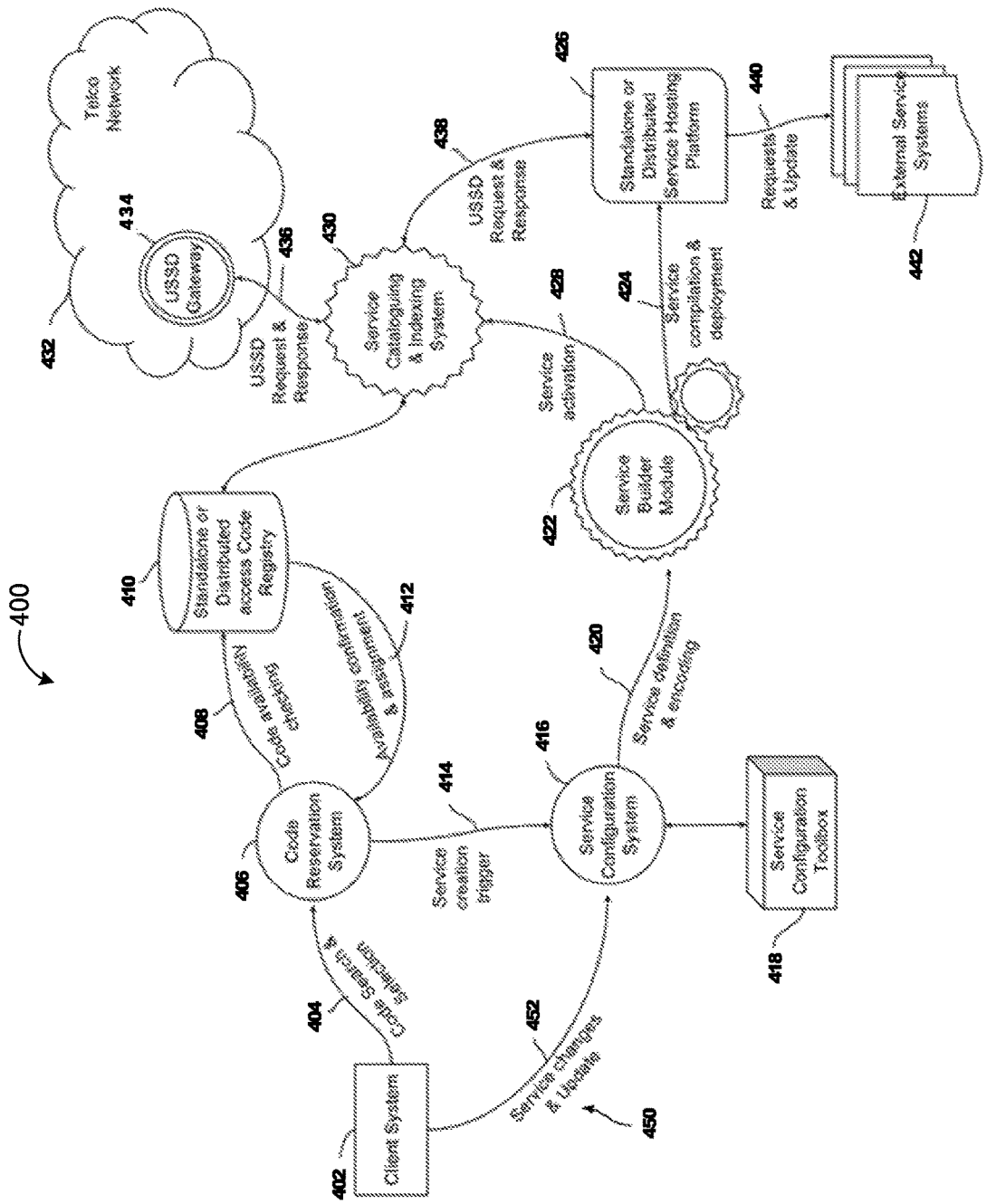
FIG. 4 illustrates a block diagram of a dynamic unassisted USSD code assignment and services management and hosting system providing a detailed look of the reservation, service creation and deployment aspects of the online IT system of FIG. 3, according to some embodiments.

FIG. 4 illustrates a block diagram of a dynamic unassisted USSD code assignment and services management and hosting system 400 providing a detailed look of the reservation, service creation and deployment aspects of the online IT system 300 of FIG. 3, according to some embodiments. The USSD code and services management and hosting system 400 is an example of a real-time USSD code search, assignment/reservation, services creation, deployment, information storage and retrieval system implemented as computer programs on one or more computers in one or more locations, or programmable devices, in which the systems, components, and techniques described below, may be implemented.

Using a search and selection application interface 404 of a service code reservation system 406, accessed using a client system 402 (such as web browser on a laptop or handheld device, or even a USSD client), a prospective USSD service provider (for example, the service provider 106) searches for or selects an available primary and a sub USSD code which will uniquely identify his or her USSD-based service or services. The code reservation system 406 may be configured to send a query 408 to a standalone or distributed single- or multi-operator code registry 410 to confirm availability of the requested code, in line with any applicable qualification criteria or guidelines. The code registry 410 may constitute a core functional part of the USSD service cataloguing and indexing system 430 which in turn may be integrated with the USSD gateway 434, which is a system that handles USSD request signals received or transmitted by the telecom operator core network (MSC/HLR) 432 to and from customer's mobile devices.

On confirmation of availability 408 of the requested code, the code reservation system 406 processes the approval and assignment of the code 412 to the service provider, which may be a multi-step process with or without authorization or bill payment by the service provider. Due to the multi-user nature of publicly available web-scale applications as this, a concurrency management method, may be implemented to guarantee code uniqueness and quality assurance.

After a successful assignment and reservation 412 of service code for a service provider's intended service, a service creation trigger 414 may be automatically initiated to kickstart the process of real-time definition and setup of the intended USSD service using a service configuration system 416 and pre-provided service creation toolbox 418 (a set of user friendly interfaces, templates and commands), with an add-on system to encode service definitions 420 and send the encoded package to a service builder module 422 which in turn decodes, compiles and deploys 424 the executable service to a standalone or distributed service hosting platform 426, which may also include billing and other related capabilities. On successful deployment of the service (which may include service approval processes for compliance or other relevant requirements), a service activation process 428 may be triggered to activate (or publish) the service on the service cataloguing and indexing system 430, which makes the service open (accessible) to all eligible mobile telecommunication customers or users.

The USSD gateway 434 integrated into the mobile telecommunication operator core network 432 may be configured to redirect all USSD request calls 436 sent to a particular primary access code (and in this case with its associated sub access code or range of codes) to the service cataloguing and indexing system 430, which is enabled to coordinate the request routing and processing of the request to the service hosting platform 426, with or without an intermediate low bandwidth content formatter or scaling system. The service hosting platform 426 for versatility, robustness, security and extensibility may be enhanced with capabilities to integrate with external service provisioning or handling systems 442 that may handle service requests 440 not available on the hosting platform 426.

Provision may also be made for a service modification processor 450 via the service configuration system 416 for owners of existing services to make changes and update 452 to services and information hosted on the service hosting platform 426 or other destination servers.

The USSD protocol supports information exchange with backend application servers at code dial time by allowing the appendage of any number of any characters to a primary access code, which is followed by the "*" (asterisk) character, used to delimit the end of the primary access code and the beginning of the variable content string which is terminated by the "#" character according to technical GSM 02.90 (ETSI TS 100 625, V7.0.0) specification, for example, a when a user dials set of string such as *222*1122445588779933#, it would be interpreted as 222 is the primary access code, while 1122445588779933 is a content or information that will be passed on to the network entity application handling the service code for processing.

With a versatile backend system, the above functionality (variable length substring used normally for passing content or info) may be transformed to distinct (and unique) access codes, which may be dynamically assigned to (and used for accessing) specific services on the network entity backend applications. This will allow multiplexing a single USSD access code (a scarce resource) to support over 200 trillion user friendly distinct access codes in a case where variable content length is restricted to a maximum of 15 digits (derivable from $P_{(n,q,r)} = \Sigma_{i=q}^{r} n^i$, where n may be 10 or less of any of the dialable keypad numbers [0-9] depending on the intended code numbers, and q is minimum and r is maximum length of variable length appended access code). The codes may be dynamically allocated on-demand to service providers or communication devices (with or without assignment/allocation rules), and with the possibility of each distinct code unified across multiple operators for a specific service access. This enables versatility considerable in scale to the world wide web domains.

For human friendly code selection, use, and referencing, an alphanumeric-to-dial-pad (that may be based on ITU E.161 or ANSI T1.703-1995/1999, or ISO/IEC 9995-8: 1994) code mapping may be applied, with system enabled concurrency management for sub access code selection and assignment integrity or quality assurance. As an example of such implementation, a service provider (the US Patent Office) might search for the availability an access code *222*USPTO# which is alphanumeric-to-dial-pad mapped to *222*87786#. This may also be applicable to primary access code as well as USSD supports variable length primary code numbering, for example, the scheme above may also work for assigning a primary access code that matches; for example, FirstBank and service accessed by dialing *347782265# on the phone keypad.

Figure 5:
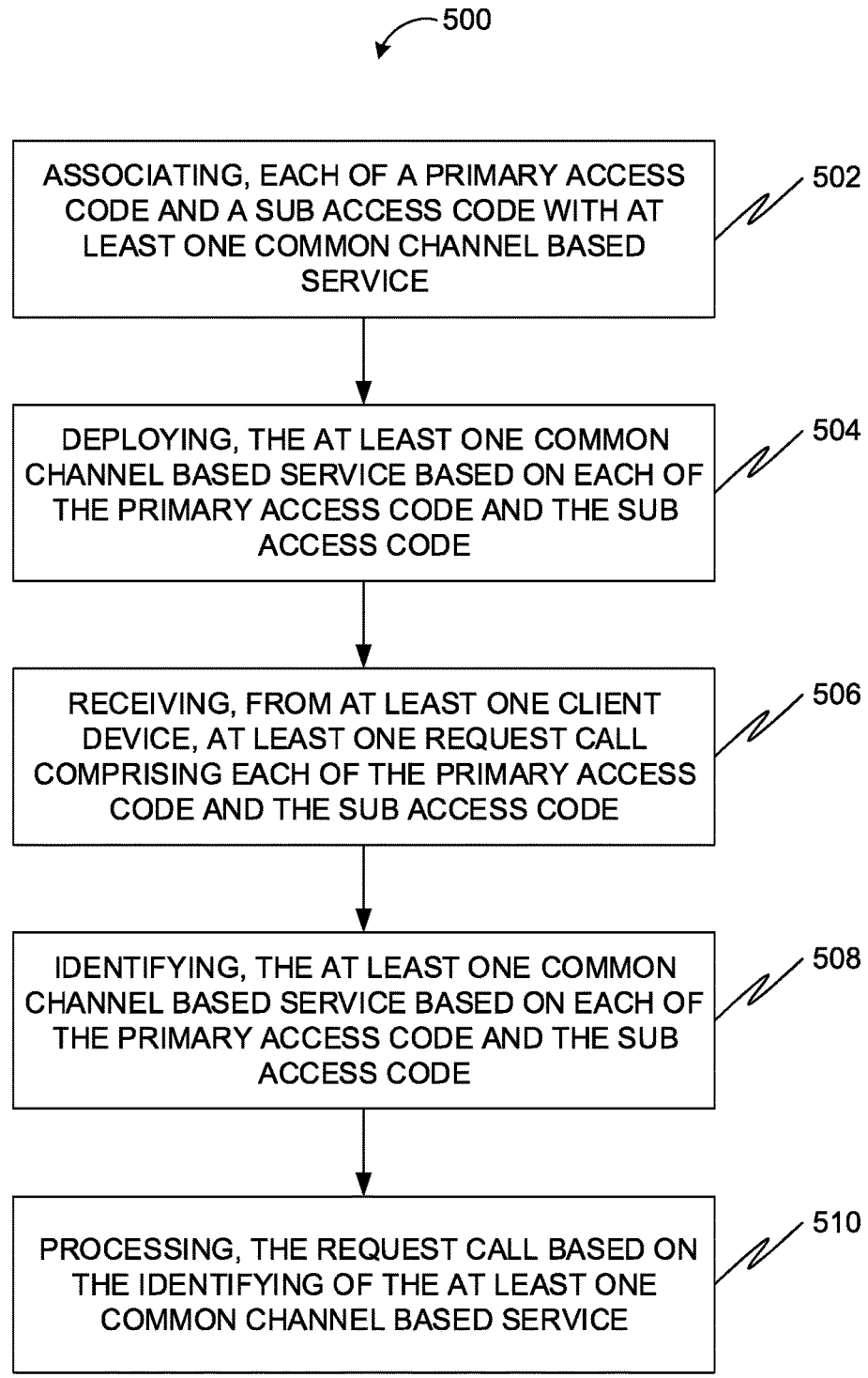
FIG. 5 illustrates a flowchart of a method of facilitating management of common channel based services, in accordance with an embodiment.

FIG. 5 illustrates a flowchart of a method 500 of facilitating management of common channel based services, in accordance with an embodiment. At 502, the method 500 includes associating, using a processor (such as the processor 206), each of a primary access code and a sub access code with one or more common channel based services. The one or more common channel based services may include a USSD based service. A length of the primary access code may be fixed and the length of the sub access code may be variable. Alternatively, the length of each of the primary access code and the sub access code may be fixed.

The primary access code may be assigned to a service provider provisioning the one or more common channel based services, wherein the primary access code may be assigned by at least one of a regulatory body and a telecommunications operator (such as the telecom operator 102).

The associating may further include reserving, using a code reservation module, each of the primary access code and the sub access code. The reserving may include receiving, through an input device, one or more queries comprising each of the primary access code and the sub access code. Next, the reserving may also include searching a registry based on the at least one query to determine availability of each of the primary access code and the sub access code, wherein the reserving of each of the primary access code and the sub access code is associated with the one or more queries based on the availability. The one or more queries may include multiple queries, wherein each of the multiple queries may include each of the primary access code and the sub access code, wherein the reserving of each of the primary access code and the sub access code may be associated with only one of the multiple queries. Further, one or more qualification criteria associated with each of the primary access code and the sub access code may be obtained from the input device, wherein the searching is based on the one or more qualification criteria. For example, the qualification criteria may include some mandatory alphanumeric characters. Next, through a display device, each of the primary access code and the sub access code may be presented. Thereafter, using an input device, a confirmation may be received to reserve each of the primary access code and the sub access code. Further, bill payment may be received, wherein the reserving of each of the primary access code and the sub access code is based on the receiving of the bill payment.

At 504, the method 500 includes deploying, using the processor, the one or more common channel based services based on each of the primary access code and the sub access code. In a further embodiment, the deploying may further include creating, using the processor, the one or more common channel based services based on one or more service definitions. Further, the deploying may include activating, using the processor, the one or more common channel based services.

At 506, the method 500 includes receiving, from one or more client devices, one or more request calls, wherein each request call comprising each of the primary access code and the sub access code. The request call may include a service identification portion and a payload portion, wherein the service identification portion comprises the primary access code, wherein the payload portion comprises the sub access code. The one or more client devices may include one or more of a mobile communication device and a sensor device.

At 508, the method 500 includes identifying, using the processor, the one or more common channel based services based on each of the primary access code and the sub access code. The method 500 may further include determining, using the processor, presence of alphabetic characters in one or both of the primary access code and the sub access code; and translating, using the processor, the alphabetic characters into corresponding dial-pad characters based on the determining.

At 510, the method 500 includes processing, using the processor the request call based on the identifying of the one or more common channel based services.

The method may further include routing the one or more request calls to one or more destination servers, wherein the deploying comprises hosting the one or more common channel based service on the one or more destination server.

Figure 6:
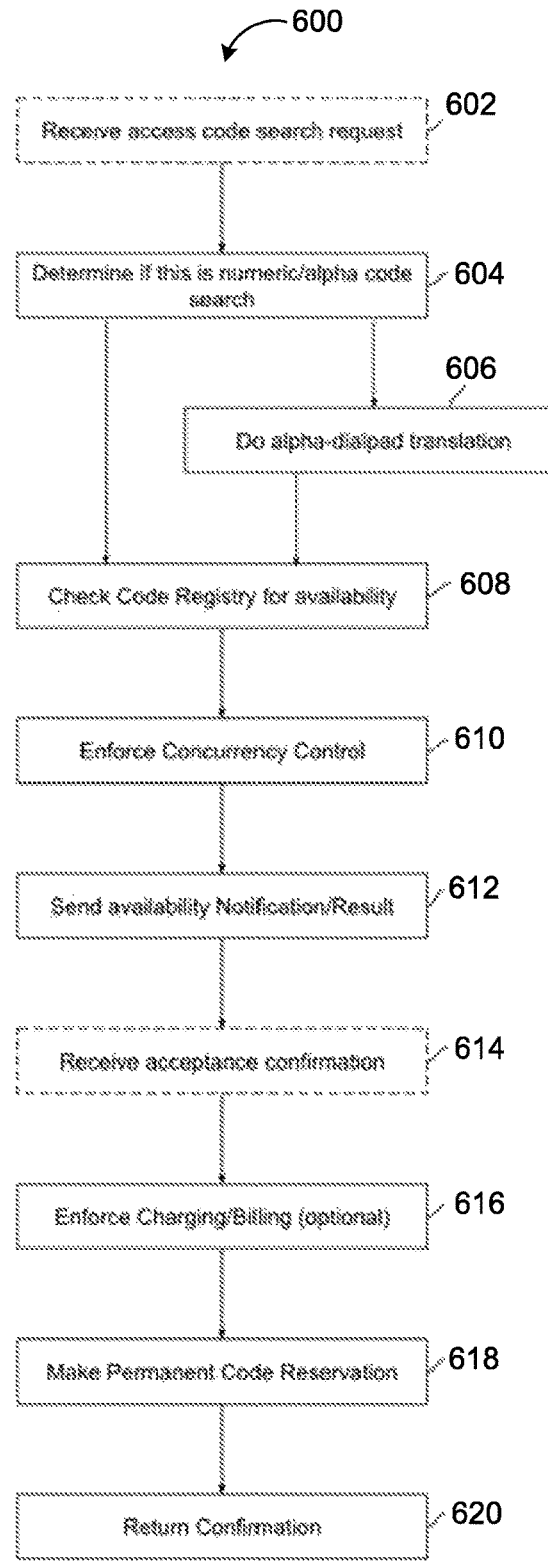
FIG. 6 illustrates a flowchart of a call flow for a dynamic on-demand, self-service USSD code search and assignment, in accordance with an embodiment.
Figure 7:
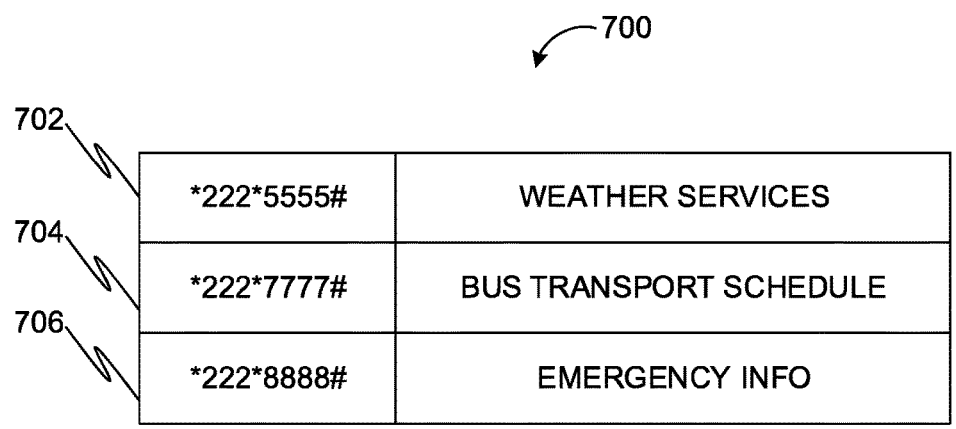
FIG. 7 illustrates a table including a plurality of access codes, in accordance with an exemplary embodiment.

FIG. 6 illustrates a flowchart of a call flow 600 for a dynamic on-demand, self-service USSD code search and assignment, in accordance with an embodiment. At 602, the call flow 600 includes receives code search request. For example, the request may be for a USSD access code defined as per the protocol specifications, wherein the access code is punctuation by the * and # characters (delimiters). Distinct services may be uniquely identified with variable-length sub access codes of a primary access code, as shown in FIG. 7. FIG. 7 illustrates a table 700 including multiple access codes 702-706, in accordance with an exemplary embodiment. The access code 702 is *222*5555#, the access code 704 is *222*7777#, and the access code 706 is *222*8888#; wherein 222 is the primary access code and 5555, 7777 and 8888 are sub access codes (or extensions). The access code 702 is related to weather services, the access code 704 is related to bus transport schedule, and the access code 706 is related to emergency information.

Such schemes are useful in situations requiring efficient utilization of limited numbering (USSD codes in this case), or cases where simplification of associations are required, for example, simple and distinct codes may be assigned to States of a nation, and common sub access codes used to identify similar services. Use of similar patterns are found in national telephony numbering and Internet domain/subdomain naming conventions.

The call flow 600 may receive request for primary access code or sub access code search and selection 602 and offer any of numeric search, all alphabets search or alphanumeric search options to enable easy and high adoption, customer code affinity and retention. For example, a USSD code naming scheme may allow service providers to search and select codes based on meaningful alphabetic or alphanumeric names. In such schemes, the alphabetic or alphanumeric code selected by a service provider may be translated to a dial-pad character to numeric code mapping algorithm to valid USSD numeric code, for example, a primary-subcode combination of *222*WEATHER# will map to *222*9328437#.

At 604, the system determines if the search request 602 is all numeric, alphabets or alphanumeric, and if alphabets or alphanumeric, may be configured to engage an alphanumeric-dial-pad translator 606 according to chosen dial-pad schemes as explained above.

At 608, the requested access code 602 is checked against the code registry (for example, the code registry 312) for availability in line with any application controls or policies. Further, multiple requests for same code may be received. Therefore, at 610, concurrency control may be enforced, using any of the known or possible concurrency control methods to avoid double assignment of same code. Thereafter, the call flow 600 includes conveying the result of a successful availability 612 to the prospective service provider. On occasion that the code is not available at 608, the availability notification event 612 is invoked immediately and user may be given option to choose another code, or even provided suggested available options, or the call flow 600 may be terminated.

With an available code at 608 and delivery of result to use in at 612, the call flow 600 may demand and process an acceptance of the code from the service provider at 614, enforce a payment process at 616, before making a permanent allocation or reservation of the code to the service provider at 618, and wrapping up the transaction with at 620 by sending a confirmation to the service provider.

Figure 8:
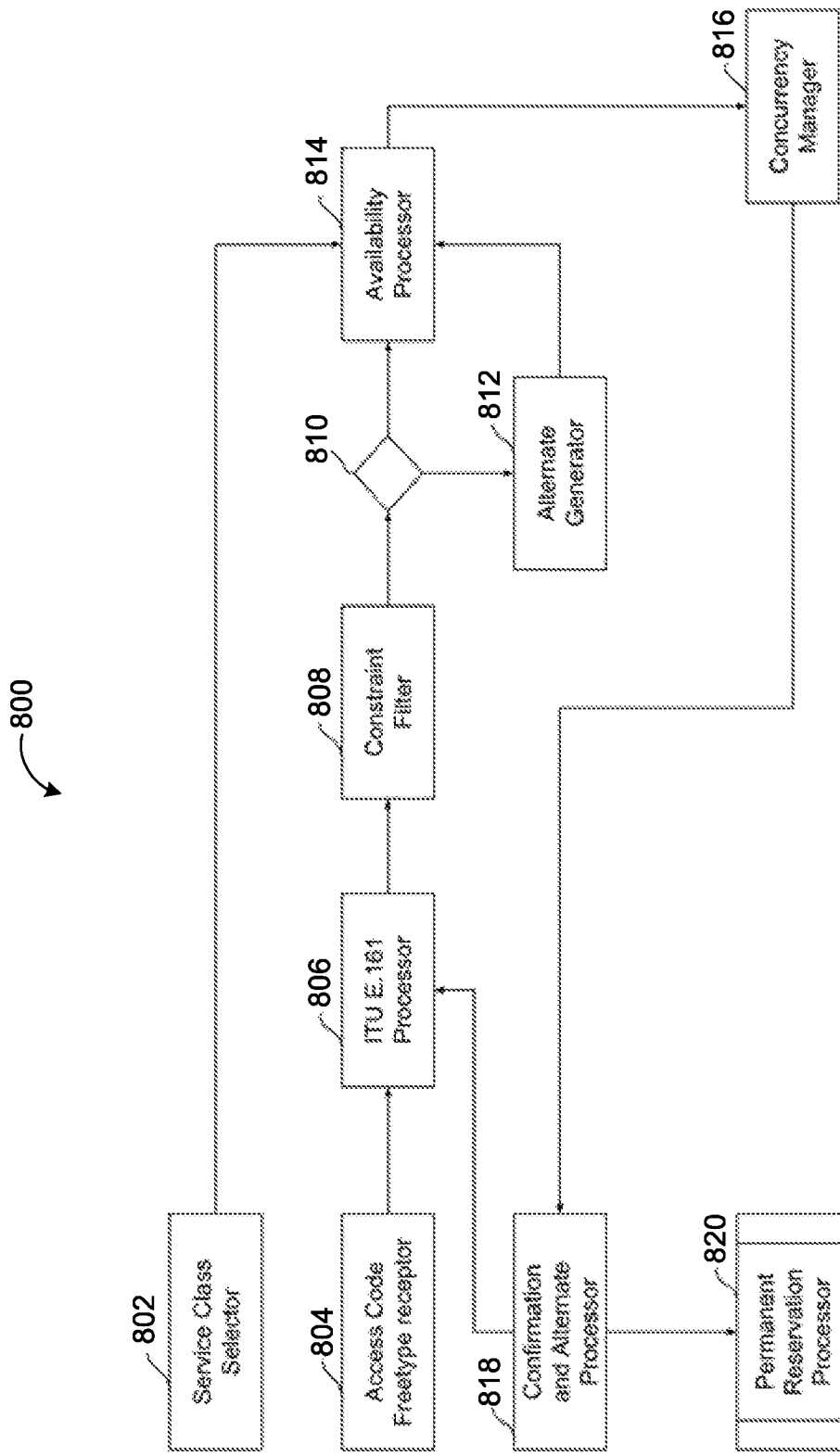
FIG. 8 illustrates a flowchart of a service code multiplexing process according to some embodiments.

FIG. 8 is a flowchart of an example service code multiplexing process 800 that provides added user-friendliness and support large scale adoption according to some embodiments in the present disclosure. One or more options of primary service codes pre-assigned to an operator by a telecommunication regulatory body may be offered to a public of intending common channel based service owners in a selection processor 802. In addition to a primary code, a freetype alphanumeric sub access code 804 is provided as mandatory input parameters to a unique service code availability checking system 814. Further, an alphanumeric to DialPad translator module 806, such as based on ITU E.161, may be implemented to enable user-friendly search, select, share, and use of the access code. Some controls such as maximum or minimum sub access code length, reserved codes, and pattern restrictions may be required. A constraint filter handler 808 may be implemented to auto enforce compliance. If a user's request is found to be non-compliant at 810, the process 800 may go to an alternate generator module 812 that offers to the user, compliant alternatives and handle review, modification, and selection of new access code by user in conjunction with an alternate processor 818 before submission to the availability checking processor 814. Further, one or more concurrency processor systems 816 may be required to ensure accuracy and uniqueness of code in a multi-user processing environment, while processing confirmation and acceptance 818 of available code and final code assignment and reservation 820.

Figure 9:
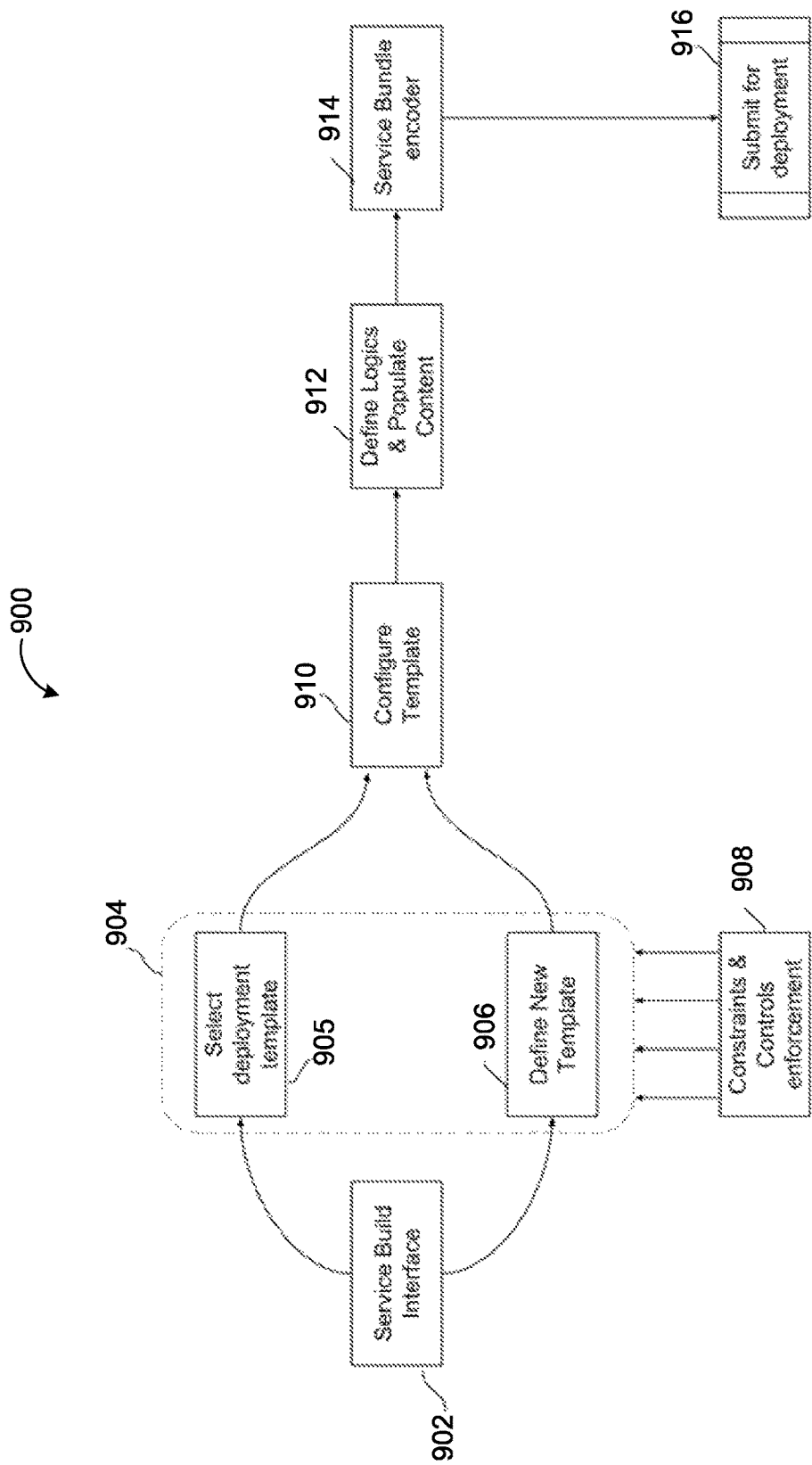
FIG. 9 illustrates a block diagram of a user self-service USSD service creation and deployment system according to some embodiments.

FIG. 9 is a block diagram of a user self-service USSD service creation and deployment system 900 that may be implemented in system form to facilitate simplified creation or build of USSD services based on standard application templates expressed in markup languages or notations encapsulating both content and process logics which can be encoded into a deployment service (application) bundle, capable of being stored on an article of manufacture to facilitate transporting and transferring such methodologies to compatible hosting apparatus. An intending common channel based service owner may be offered access to the service creation and deployment system 900 via an online service creation interface 902. For example, the online service creation interface 902 may be one of web-based, mobile-based, MMI-based, or App based interface. The service creation and deployment system 900 may include a template selection and creation system 904, providing self-service capabilities for users to either select from a library of predefined templates 905 or create custom service templates using a user-friendly template building module 906, which may be further regulated by a constraint enforcement module 908 that ensures that new template created by users are built according to defined specifications. Then, the chosen or the custom template may be configured at 910 based on service type, integration requirements, host plan or other parameters. Next, service rules may be defined and contents added to the template using a logic and content module 912, and further validated, error checked and encoded into a service bundle by a service bundle encoder 914 before submission for deployment 916.

Figure 10:
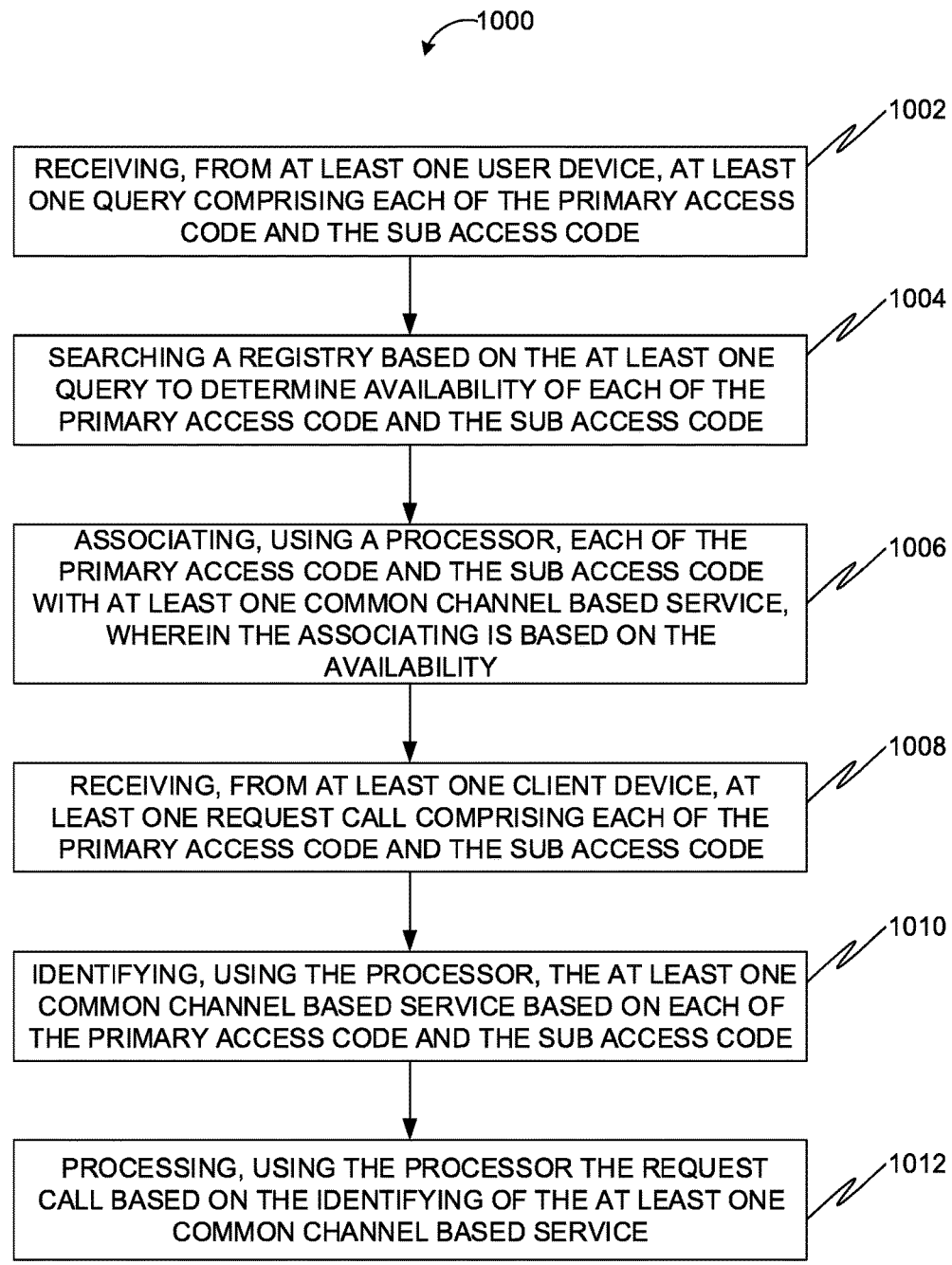
FIG. 10 illustrates a flowchart of a method of facilitating management of common channel based services, in accordance with an embodiment.

FIG. 10 illustrates a flowchart of a method 1000 of facilitating management of common channel based services, in accordance with an embodiment. At 1002, the method 1000 includes receiving, using a processor (for example, the processor 206), from one or more user devices, one or more queries comprising each of the primary access code and the sub access code.

At 1004, the method 1000 includes searching, using a processor, a registry (for example, the code registry 312), based on the one or more queries to determine availability of each of the primary access code and the sub access code.

At 1006, the method 1000 includes associating, using a processor, each of the primary access code and the sub access code with one or more common channel based services, wherein the associating is based on the availability.

At 1008, the method 1000 includes receiving, using a processor, from one or more client devices (for example, one or more client devices may be held by the user 104), one or more request calls comprising each of the primary access code and the sub access code.

At 1010, the method 1000 includes identifying, using the processor, the one or more common channel based services based on each of the primary access code and the sub access code.

At 1012, the method 1000 includes processing, using the processor, the request call based on the identifying of the one or more common channel based services.

Figure 11:
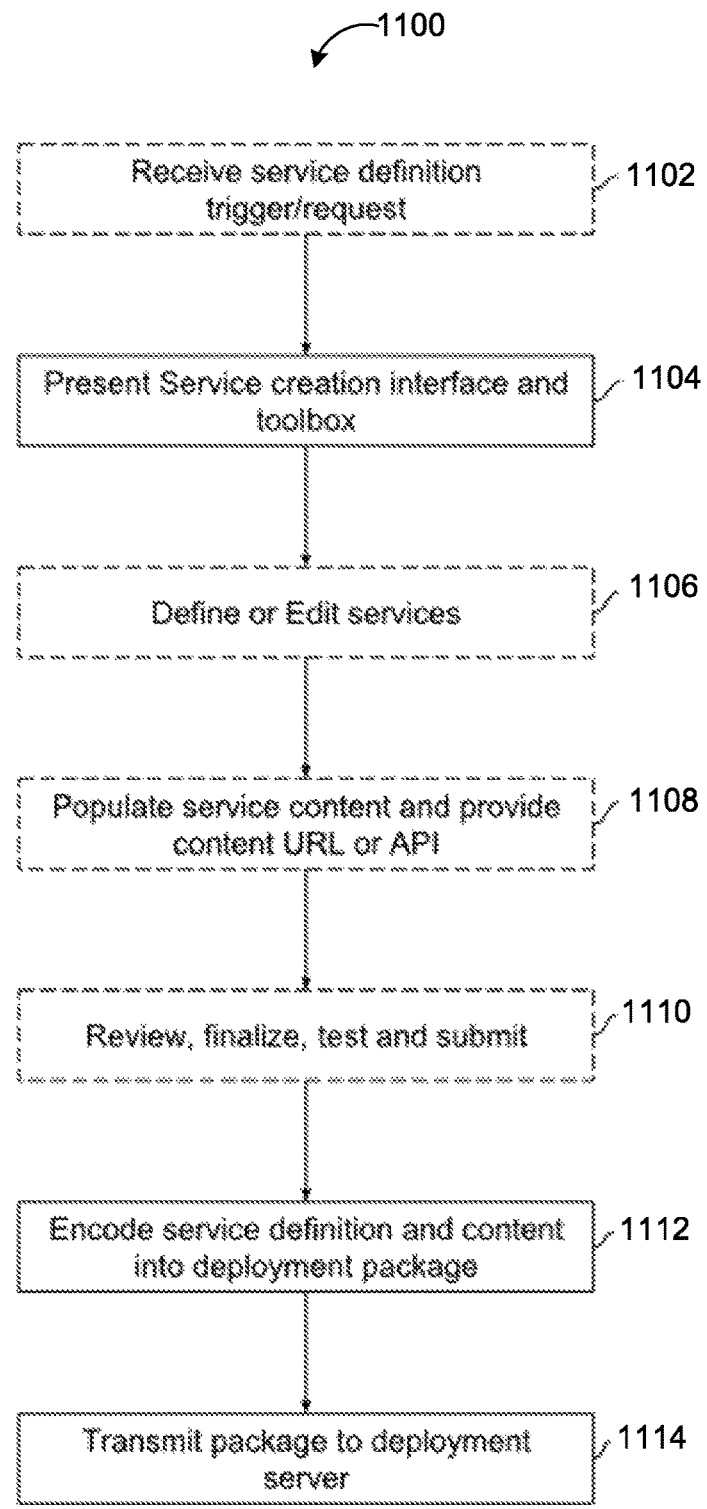
FIG. 11 illustrates a flowchart of a call flow of USSD service creation, editing, and encoding according to some embodiments.

FIG. 11 illustrates a flowchart of a call flow 1100 of USSD service creation, editing, and encoding according to some embodiments.

At 1102, the call flow 1100 includes receiving a request to create a new service or edit an existing service. At 1104, service creation interface and toolbox (including predefined templates) may be presented. Further, the users may be allowed to self-define new application templates and logics, add content, simulate and test operation and performance of their services.

Steps 1106, 1108 and 1110 encapsulate all user actions required to complete the USSD service creation of the intended service or services. This includes defining or editing service definitions at 1106; populating service content and providing URL or API at 1108; and reviewing, finalizing, testing and submit the service definition at 1110.

At 1112, the call flow 1100 includes encoding service definition and content into a deployment package, which may be stored on an article of manufacture, and transported in at 1114 to a processor apparatus for deployment in the final or intermediate hosting system, server or network.

Figure 12:
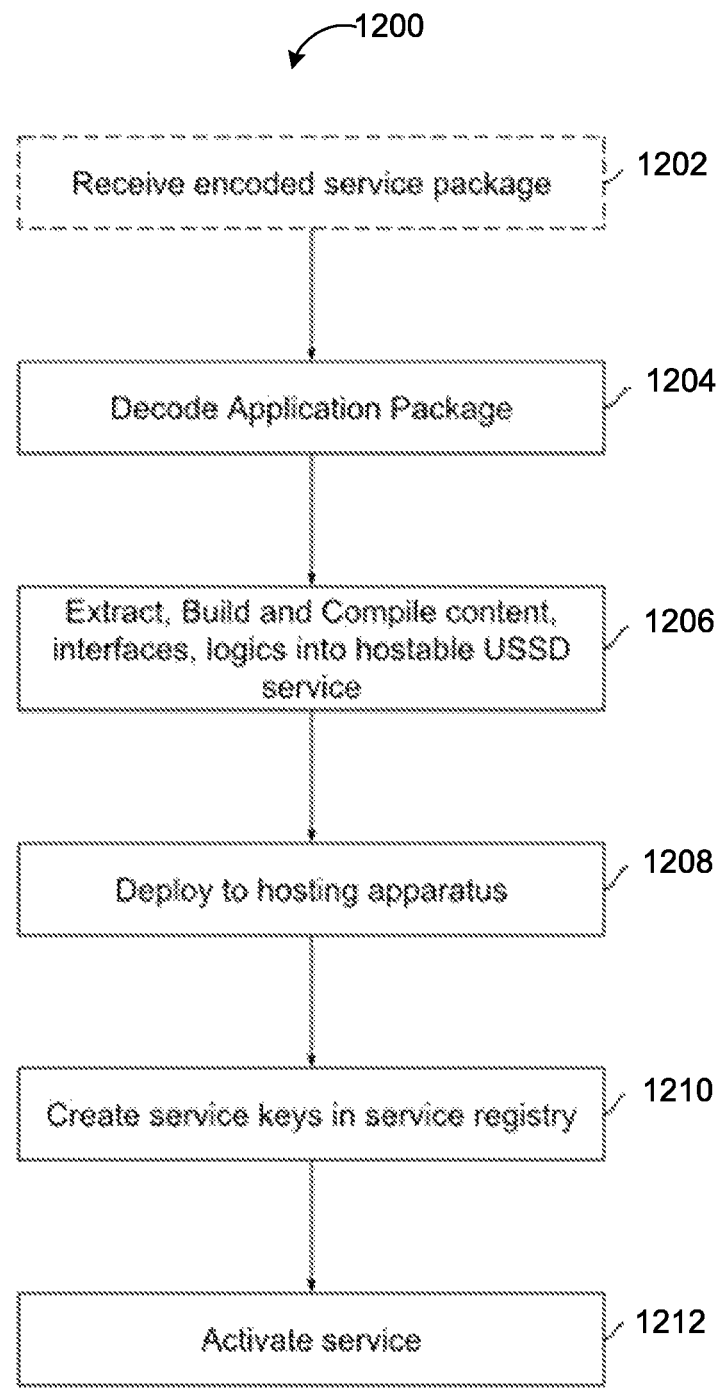
FIG. 12 illustrates a flowchart of a process of service package compilation, hosting and activation according to some embodiments.

FIG. 12 illustrates a flowchart of a process 1200 of service package compilation, hosting and activation according to some embodiments. The process 1200 allows immediate user-led dynamic web-scale deployment on one or more computers or network of computer systems located in one or more locations.

At 1202, the process 1200 includes receiving encoded service definition package. Then at 1204, the application package may be decoded based on pre-defined constraints, with or without security token validation. At 1206, the application is extracted, built and compiled into hostable USSD service built with all menus, interfaces, logics/flows.

At 1208, the compiled hostable service package is deployed to the hosting apparatus, system or network. Then at 1210, the process 1200 includes mapping of the service hosting pointers to pre-allocated service access code unto a service cataloguing and indexing or registry system (for example, the code registry 312).

At 1212, the service is activated and made available to authorized users via capable User equipment (UE).

Figure 13:
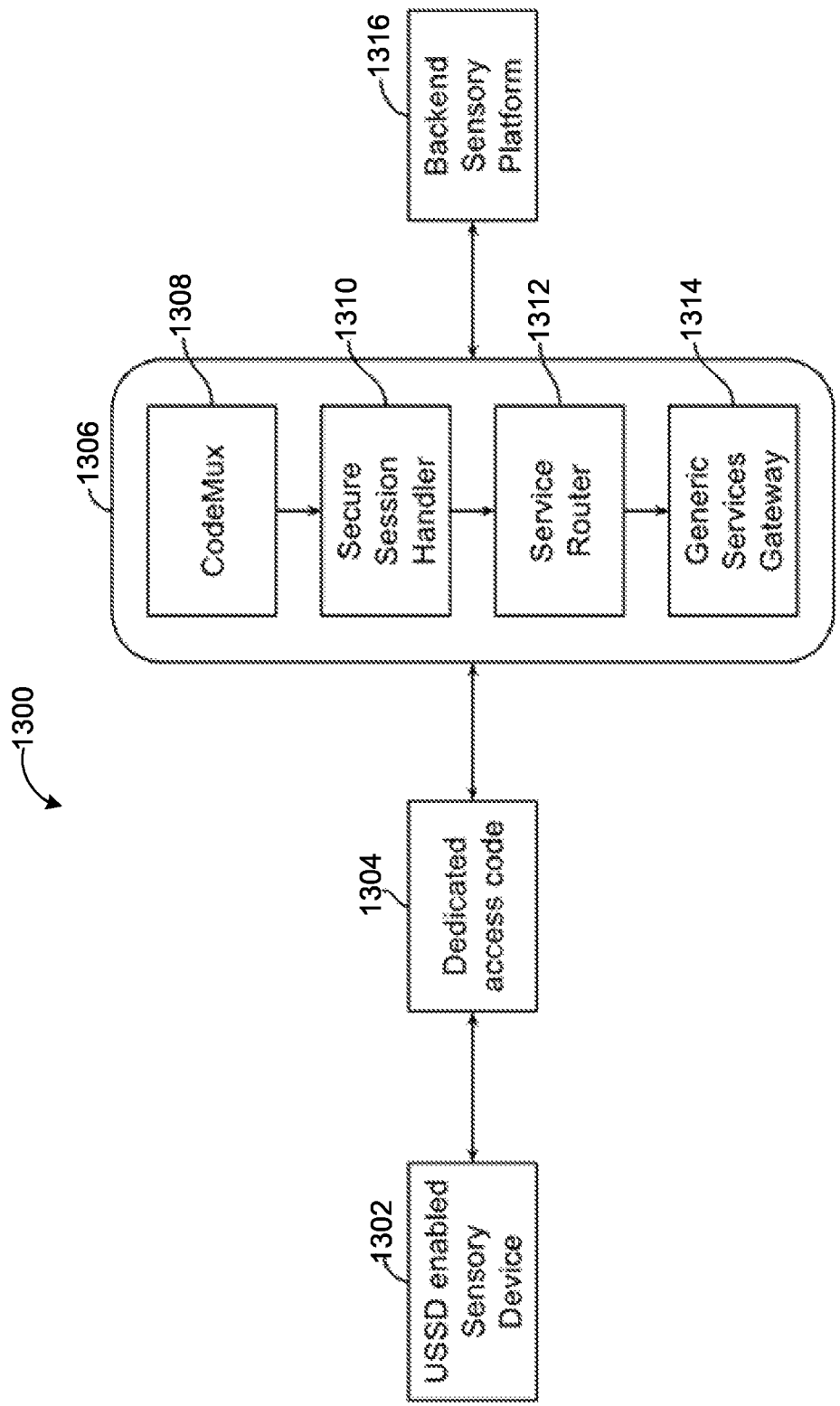
FIG. 13 is a block diagram illustrating USSD service delivery implementation according to some embodiments.

FIG. 13 is a block diagram illustrating USSD service delivery implementation system 1300 according to some embodiments. Specifically, the USSD service delivery implementation system 1300 is designed to support field sensor and Internet of Things (IoT) device applications.

The USSD service delivery implementation system 1300 includes a USSD enabled sensory device 1302 for collecting natural, scientific, or other field data or signals. Sensor devices, such as MicroElectroMechanical (MEM) devices, may be integrated into a system board, which may be programmed to include a USSD Man-Machine Interface (MMI) auto-handling module to create the USSD enabled sensory device 1302. Using the embedded MMI module, the sensory device 1302, may initiate connection via telecommunication radio access networks, using the common channel, to transmit collected data to a destination backend sensory platform 1316, pre-identified and linked to a dedicated access code 1304, in a two-way reliable session efficiently handled by multi-transaction handling service delivery system 1306. The delivery system 1306 may include one or more of a multiplexed-codes handler (Code-Mux) 1308, a secure sessions handler 1310, a service router 1312, and a Generic Services Gateway 1314.

The functions described above may be implemented in hardware, software, firmware, or any combination thereof. Further, the functions may be implemented as network of systems or a single system appliance.

It will be appreciated by those skilled in the art that various other omissions, additions and modifications may be made to the methods, tools, schemes and apparatus described above without departing from the scope of the invention. All such modifications and changes are intended to fall within the scope of this disclosure.

In accordance with various aspects of the present disclosure, for the purposes of simplicity of explanation, some of the preceding illustrations are methods described as a series of acts or sequence steps. It is to be appreciated that such disclosure is not limited by the order of acts, as some acts may occur in different orders and/or concurrently with other acts from that shown and described herein, and may be alternatively represented as a series of interrelated states or events diagrams. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Although the invention has been explained in relation to its preferred embodiment, it is to be understood that many other possible modifications and variations can be made without departing from the spirit and scope of the invention.

What is claimed is:

1. A method of facilitating management of common channel based services, the method comprising:
    associating, using a processor, each of a primary access code and a sub access code with at least one common channel based service;
    deploying, using the processor, the at least one common channel based service based on each of the primary access code and the sub access code;
    receiving, from at least one client device, at least one request call comprising each of the primary access code and the sub access code;
    identifying, using the processor, the at least one common channel based service based on each of the primary access code and the sub access code;
    processing, using the processor the request call based on the identifying of the at least one common channel based service; and
    reserving, using a code reservation module, each of the primary access code and the sub access code, comprising:
        receiving, through an input device, at least one query comprising each of the primary access code and the sub access code; and
        searching a registry based on the at least one query to determine availability of each of the primary access code and the sub access code, wherein the reserving of each of the primary access code and the sub access code is associated with the at least one query based on the availability.

2. The method of claim 1, wherein the at least one common channel based service comprises an Unstructured Supplementary Service Data (USSD) based service.

3. The method of claim 1 further comprising receiving, through the input device, at least one qualification criteria associated with each of the primary access code and the sub access code, wherein the searching is based on the at least one qualification criteria.

4. The method of claim 1 further comprising:
    presenting, through a display device, each of the primary access code and the sub access code; and
    receiving, using an input device, confirmation to reserve each of the primary access code and the sub access code.

5. The method of claim 4 further comprising receiving a bill payment, wherein the reserving of each of the primary access code and the sub access code is based on the receiving of the bill payment.

6. The method of claim 1 wherein the at least one query comprises a plurality of subqueries, wherein each of the plurality of subqueries comprises each of the primary access code and the sub access code, wherein the reserving of each of the primary access code and the sub access code is associated with only one of the plurality of subqueries.

7. The method of claim 1 further comprising creating, using the processor, the at least one common channel based service based on at least one service definition.

8. The method of claim 1 further comprising activating, using the processor, the at least one common channel based service.

9. The method of claim 1 further comprising routing the at least one request call to at least one destination server, wherein the deploying comprises hosting the at least one common channel based service on the at least one destination server.

10. The method of claim 1, wherein a length of the primary access code is fixed, wherein a length of the sub access code is variable.

11. The method of claim 1, wherein a length of each of the primary access code and the sub access code is fixed.

12. The method of claim 1, wherein the request call comprises a service identification portion and a payload portion, wherein the service identification portion comprises the primary access code, wherein the payload portion comprises the sub access code.

13. The method of claim 1, wherein the primary access code is assigned to a service provider provisioning the at least one common channel based service, wherein the primary access code is assigned by at least one of a regulatory body or a telecommunications operator.

14. The method of claim 1 further comprising:
    determining, using the processor, presence of alphabetic characters in at least one of the primary access code and the sub access code; and
    translating, using the processor, the alphabetic characters into corresponding dial-pad characters based on the determining.

15. The method of claim 1, wherein the at least one client device comprises at least one of a mobile communication device or a sensor device.

16. A system for facilitating management of common channel based services, the system comprising:
    a communication module configured for receiving at least one request call comprising each of a primary access code and a sub access code;
    a storage module configured to store a registry comprising an association between the common channel based service and each of the primary access code and the sub access code;
    a processor configured for:
        identifying the at least one common channel based service based on each of the primary access code and the sub access code;
        processing the request call based on the identifying of the at least one common channel based service;
    the communication module further configured for receiving at least one query comprising each of the primary access code and the sub access code;
    the processor further configured for:
        searching the registry based on the at least one query to determine availability of each of the primary access code and the sub access code;
        reserving each of the primary access code and the sub access code in association with the at least one query based on the availability.

17. The system of claim 16, wherein the processor is further configured for:
    determining presence of alphabetic characters in at least one of the primary access code or the sub access code; and translating the alphabetic characters into corresponding dial-pad characters based on the determining.

18. The system of claim 16, wherein the at least one common channel based service comprises an Unstructured Supplementary Service Data (USSD) based service.

19. The system of claim 16, wherein the at least one request call is associated with a generic external server, wherein the communication module is further configured for communicating with the generic external server, wherein the processor is further configured for performing at least one of conversion of the at least one request to a form compatible with the generic external system and conversion of at least one response received from the generic external server to a form compatible with a client device associated with the at least one request call.

20. A method of facilitating management of common channel based services, the method comprising:

receiving from at least one user device, at least one query comprising each of the primary access code and the sub access code; and searching a registry based on the at least one query to determine availability of each of the primary access code and the sub access code;

associating, using a processor, each of the primary access code and the sub access code with at least one common channel based service, wherein the associating is based on the availability;

reserving each of the primary access code and the sub access code in association with the at least one query based on the availability;

receiving from at least one client device, at least one request call comprising each of the primary access code and the sub access code;

identifying, using the processor, the at least one common channel based service based on each of the primary access code and the sub access code; and processing, using the processor, the request call based on the identifying of the at least one common channel based service.

* * * * *